(12) United States Patent
Bresolin

(10) Patent No.: US 9,494,404 B1
(45) Date of Patent: Nov. 15, 2016

(54) PIPE MEASUREMENT DEVICE

(71) Applicant: Denis Bresolin, Thunder Bay (CA)

(72) Inventor: Denis Bresolin, Thunder Bay (CA)

( * ) Notice: Subject to any disclaimer, the term of this patent is extended or adjusted under 35 U.S.C. 154(b) by 105 days.

(21) Appl. No.: 14/615,620

(22) Filed: Feb. 6, 2015

(51) Int. Cl.
*G01B 5/00* (2006.01)
*G01B 5/08* (2006.01)

(52) U.S. Cl.
CPC ..................... *G01B 5/08* (2013.01)

(58) Field of Classification Search
CPC .......... G01B 5/08; G01B 3/42; B23D 21/06; B23D 21/08
USPC ......................................... 33/555.1
See application file for complete search history.

(56) References Cited

U.S. PATENT DOCUMENTS

| | | | | |
|---|---|---|---|---|
| 1,624,654 | A * | 4/1927 | Brittain, Jr. | G01B 5/08 33/501.2 |
| 6,226,823 | B1 * | 5/2001 | Ma Gee | B23D 21/08 30/102 |
| 6,546,630 | B2 | 4/2003 | Davison | |
| D591,125 | S * | 4/2009 | Groten | D8/60 |
| 7,684,055 | B2 | 3/2010 | Rattunde | |
| 8,266,991 | B2 * | 9/2012 | Thorson | B23D 21/04 30/101 |
| 8,763,257 | B2 * | 7/2014 | Thorson | H01M 10/441 173/11 |
| 2002/0011005 | A1 * | 1/2002 | Takahashi | A63B 47/008 33/555.1 |
| 2002/0178599 | A1 * | 12/2002 | Smola | G01B 5/08 33/555.1 |
| 2012/0266479 | A1 * | 10/2012 | Park | G01B 5/08 33/712 |
| 2015/0033570 | A1 * | 2/2015 | Bernabe | G01B 3/34 33/555.1 |

* cited by examiner

*Primary Examiner* — Yaritza Guadalupe-McCall
(74) *Attorney, Agent, or Firm* — Crossley & Stevenson Intellectual Property Law

(57) ABSTRACT

The pipe measurement device has a pipe measurement tool body that partially encompasses a diameter of a pipe, a tubing, and such. An opening in the pipe measurement tool body is equipped with a pair of counter wheels and an opposingly positioned adjustment wheel for fitting the device to the pipe. A user tracks the device along a given length of the pipe. A counter with display screen is in operational communication with the counter wheels and records a distance traveled along the pipe and therein denotes an accurate measurement.

5 Claims, 3 Drawing Sheets

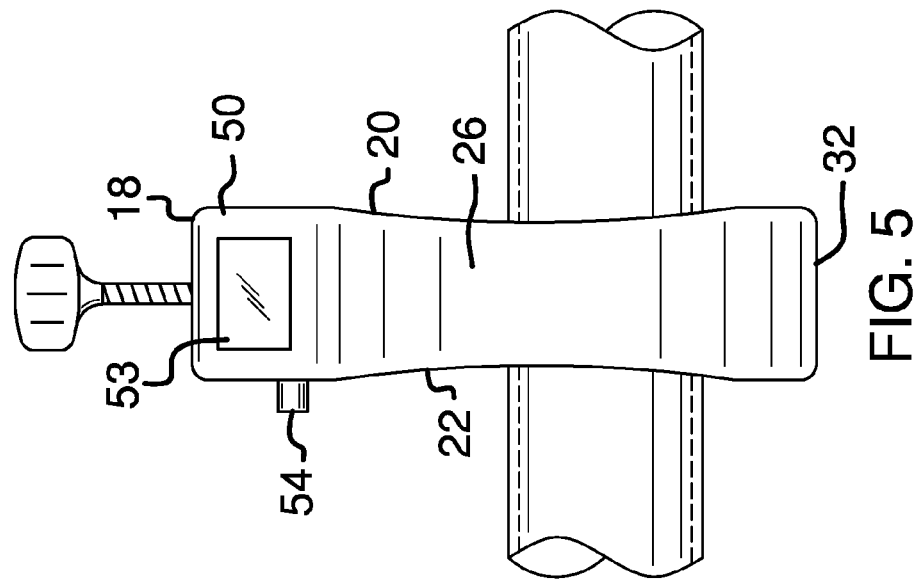
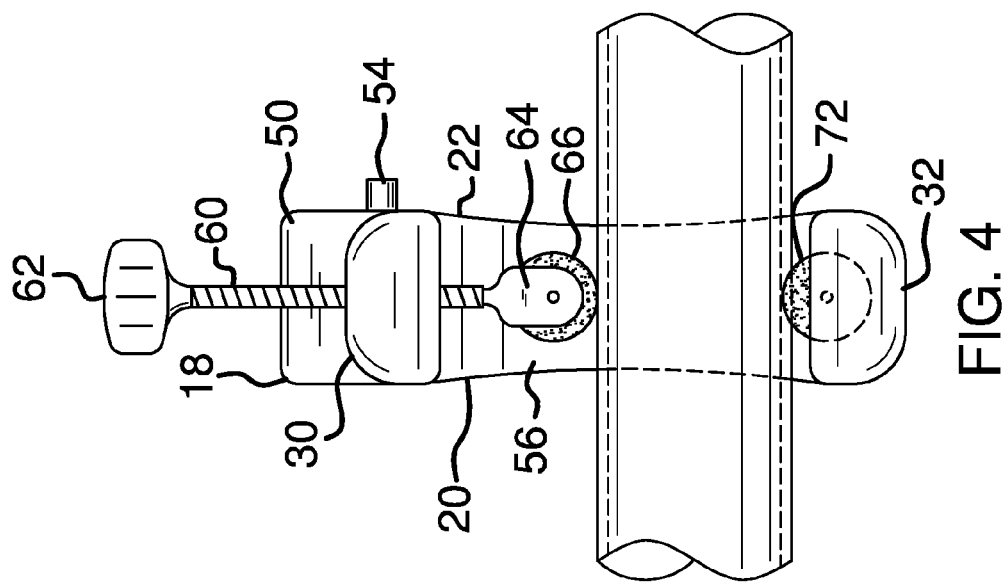

PIPE MEASUREMENT DEVICE

BACKGROUND OF THE INVENTION

Various types of pipe and tubing measuring apparatus are known in the prior art. Some are stationary and require that a pipe be passed through them. It is noted that at least one device has a tape measure attached. A common problem with measuring pipe is presented with stationary devices as manhandling a pipe's length, especially in a larger diameter size, requires considerable manpower. Another problem is that currently proffered measuring tools require at least a reasonably straight pipe to approach in accuracy in measurement. Straightening a roll of copper tubing, for example, is not only difficult, but also anneals the tubing. As the annealing toughens the copper, it becomes more difficult to work with, becoming brittle and resisting further movement, even to a point of tubing damage. What has been needed is a device that accurately measures pipe and tubing with little regard to a rolled, bent, or straight condition. Such a device should not require anchoring or being held at one end and stretched or extended to another. The device should be easily reset at any chosen point in space and time. The current pipe measurement device provides solutions to the foregoing needs.

FIELD OF THE INVENTION

The present pipe measurement device relates to linear measurement tools, and more especially to pipe measurement device that rollably receives a pipe.

SUMMARY OF THE INVENTION

The general purpose of the pipe measurement device, described subsequently in greater detail, is to provide a pipe measurement device that has many novel features that result in a pipe measurement device which is not anticipated, rendered obvious, suggested, or even implied by prior art, either alone or in combination thereof.

To accomplish this, the pipe measurement device has a pipe measurement tool body having a first side and a second side spaced apart from the first side. The pipe measurement tool body has a front side and a back side spaced apart from the front side. The pipe measurement tool body has a top end and a bottom end spaced apart from the top end. A hand cutout is disposed proximal the back side and extends from proximal the top end to proximal the bottom end. The hand cutout has a plurality of finger grooves proximal the back side. An angled protrusion extends from the top end and back side. A counter is disposed within the angled protrusion. A display screen is disposed within the dimensional counter. A reset button is disposed within the angled protrusion in the second side. The reset button is in operational communication with the counter.

A C-shaped opening is disposed in the front side and extended to proximal the hand cutout. A threaded shaft is disposed through the top end and into the C-shaped opening. An adjustment knob is disposed atop the threaded shaft. The adjustment knob is external the top end. An axled wishbone is disposed on the threaded shaft within the C-shaped opening. An adjustment wheel is disposed within the axled wishbone. The adjustment wheel has a rotation in a vertical plane. The adjustment wheel rotation is parallel to the front side.

A lower axle is disposed within the bottom end. The lower axle is disposed within a horizontal plane and oriented in a direction from the front side to the back side. A pair of spaced apart counter wheels is disposed on the lower axle. The counter wheels are disposed partially within the C-shaped opening. The counter wheels rotate in the vertical plane. The counter wheels are in operational communication with the counter and therein measure a distance traversed along the pipe by the counter wheels.

In use, the device receives a length of pipe or tubing through the C-shaped opening. The pipe is rested against the counter wheels. The adjustment knob is turned to bring the adjustment wheel to meet the pipe. The adjustment is stopped when the counter wheels and adjustment wheel are allowed to freely turn with pipe movement but do not bind the pipe. A starting point on the pipe is chosen. The reset button is pushed to zero the counter. The reset button can be pushed at any time prior to being engaged with the pipe or during traverse of a length of the pipe, therein providing for sectional measurements of the pipe as desired. The device is moved such that the second side leads the first side in passage along the pipe. When a desired length of the pipe is shown on the counter, the pipe can be marked for a cut. As the counter is bidirectional, the device can be passed along the pipe with the first side leading the second side. The device is also selectively used to measure an entire length of the pipe. A copper tubing roll, for example, can easily be slightly flexed apart and the present device tracked along a given length of the roll and therein accurately measure a linear dimension.

Thus has been broadly outlined the more important features of the present pipe measurement device so that the detailed description thereof that follows may be better understood and in order that the present contribution to the art may be better appreciated.

BRIEF DESCRIPTION OF THE DRAWINGS

Figures

FIG. 4 is an in use front side elevation view.
FIG. 5 is an in use back side elevation view.

DETAILED DESCRIPTION OF THE DRAWINGS

Figure 1:
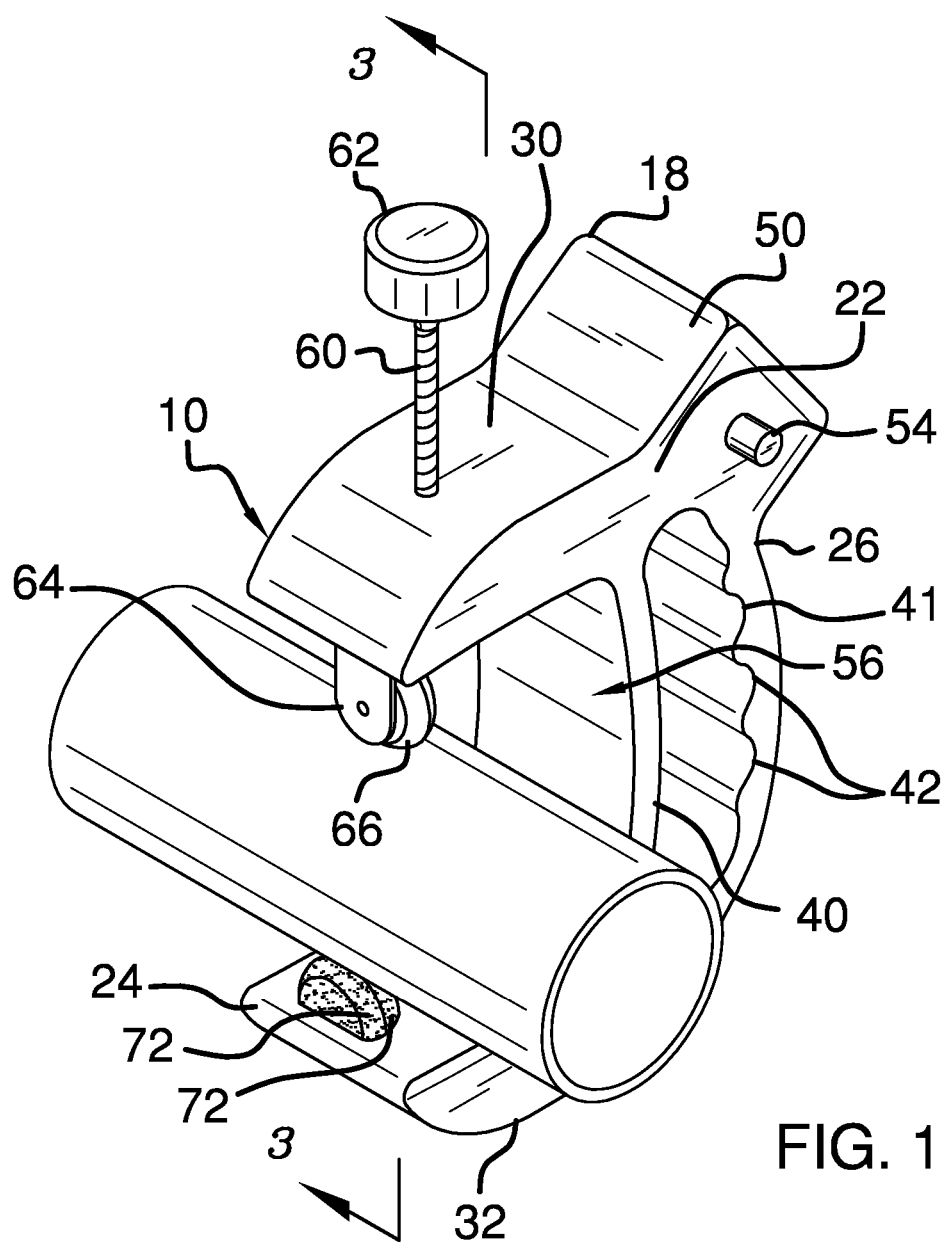
FIG. 1 is a perspective view.
Figure 3:
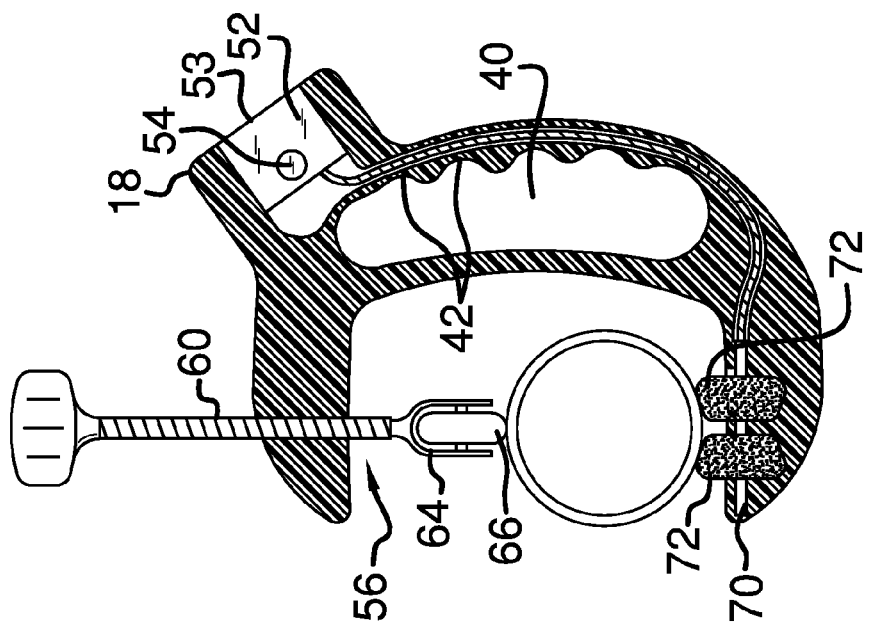
FIG. 3 is a cross sectional view.
Figure 2:
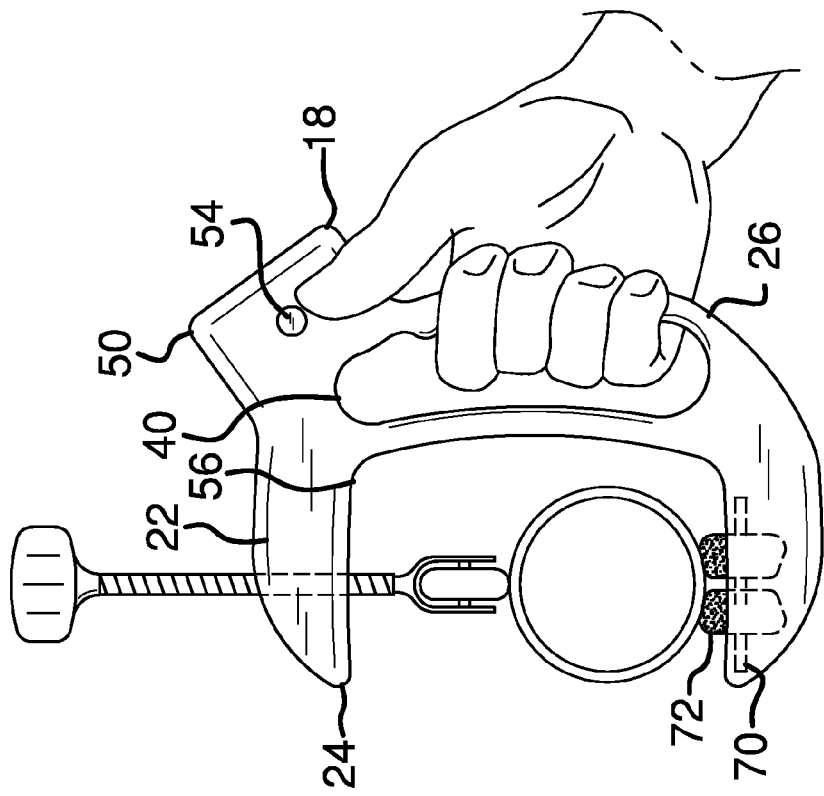
FIG. 2 is a second side elevation view.

With reference now to the drawings, and in particular FIGS. 1 through 5 thereof, an example of the pipe measurement device employing the principles and concepts of the present pipe measurement device and generally designated by the reference number 10 will be described.

Referring to FIGS. 1 through 5, the pipe measurement device 10 has a pipe measurement tool body 18. The pipe measurement tool body 18 has a first side 20 and a second side 22 spaced apart from the first side 20. The pipe measurement tool body 18 has a front side 24 and a back side 26 spaced apart from the front side 24. The pipe measurement tool body 18 has a top end 30 and a bottom end 32 spaced apart from the top end 30. A hand cutout 40 is disposed proximal the back side 26 in a position extended from proximal the top end 30 to proximal the bottom end 32. The hand cutout 40 continuously extends from the first side 20 through the second side 22. The hand cutout 40 has a plurality of finger grooves 42 along a rear side 41 thereof. An angled protrusion 50 is extended from the top end 30 and back side 26. A counter 52 is disposed within the angled protrusion 50. A display screen 53 is disposed within the dimensional counter 52. A reset button 54 is disposed within the angled protrusion in the second side 22. The reset button 54 is in operational communication with the counter 52.

A C-shaped opening 56 is disposed in the front side 24 and extended to proximal the hand cutout 40. A threaded shaft 60 is disposed through the top end 30 and into the C-shaped opening 56. An adjustment knob 62 is disposed atop the threaded shaft 60. The adjustment knob 62 is external the top end 30. An axled wishbone 64 is disposed on the threaded shaft 60 within the C-shaped opening 56. An adjustment wheel 66 is disposed within the axled wishbone 64. The adjustment wheel 66 has a rotation in a vertical plane. The adjustment wheel 66 rotation is parallel to the front side 24.

A lower axle 70 is disposed within the bottom end 32. The lower axle 70 is disposed within a horizontal plane and oriented in a direction from the front side 24 to the back side 26. A pair of spaced apart counter wheels 72 is disposed on the lower axle 70. The counter wheels 72 are disposed partially within the C-shaped opening 56. The counter wheels 72 rotate in the vertical plane. The counter wheels 72 are in operational communication with the counter 52.

In use, the device 10 receives a length of pipe or tubing through the C-shaped opening 56. The pipe is rested against the counter wheels 72. The adjustment knob 62 is configured to adjust a distance between the adjustment wheel 66 and the counter wheels 72, wherein the distance is substantially a diameter of a pipe. A starting point on the pipe is chosen. The reset button 54 is pushed to zero the counter 52. The device 10 is moved such that the second side 22 leads the first side 20 in passage along the pipe. When a desired length of the pipe is shown on the counter 52 display screen 53, the pipe can be marked for a cut. Because the counter 52 is bidirectional, the device 10 can be passed along the pipe with the first side 20 leading the second side 22 and vice versa. The device 10 is also selectively used to measure an entire length of the pipe.

What is claimed is:

1. A pipe measurement device comprising:
   a pipe measurement tool body having first side and a second side spaced apart from the first side, a front side and a back side spaced apart from the front side, a top end and a bottom end spaced apart from the top end;
   a hand cutout disposed proximal the back side in a position extended from proximal the top end to proximal the bottom end and continuously extended from the first side through the second side;
   an angled protrusion extended from the top end back side;
   a dimensional counter disposed within the angled protrusion;
   a display screen disposed within the pipe measurement tool body, the display screen being in operational communication with the dimensional counter;
   a reset button disposed within the angled protrusion, the reset button in operational communication with the counter;
   an opening disposed in the front side and extended to proximal the hand cutout;
   a threaded shaft disposed through the top end and into the opening;
   an adjustment knob disposed atop the threaded shaft, the adjustment knob external the top end;
   an axled wishbone disposed on the threaded shaft within the opening;
   an adjustment wheel disposed within the axled wishbone, the adjustment wheel having a rotation in a vertical plane, the rotation being parallel to the front side;
   a lower axle disposed within the bottom end, the lower axle disposed within a horizontal plane and oriented in a direction from the front side to the back side; and
   a pair of spaced apart counter wheels disposed on the lower axle, the counter wheels disposed partially within the opening, the counter wheels rotating in the vertical plane, the counter wheels being in operational communication with the counter;
   wherein the adjustment knob is configured to adjust a distance between the adjustment wheel and the counter wheels, wherein the distance is substantially a diameter of a pipe.

2. The pipe measurement device of claim 1 wherein the counter is bidirectional.

3. The pipe measurement device of claim 1 wherein the counter wheels are rubberized.

4. The pipe measurement device of claim 2 wherein the counter wheels are rubberized.

5. A pipe measurement device comprising:
   a pipe measurement tool body having first side and a second side spaced apart from the first side, a front side and a back side spaced apart from the front side, a top end and a bottom end spaced apart from the top end;
   a hand cutout disposed proximal the back side in a position extended from proximal the top end to proximal the bottom end and continuously extended from the first side through the second side;
   a plurality of finger grooves disposed along a rear side of the hand cutout;
   an angled protrusion extended from the top end back side;
   a dimensional counter disposed within the angled protrusion;
   a display screen disposed within the pipe measurement tool body, the display screen being in operational communication with the dimensional counter;
   a reset button disposed within the angled protrusion, the reset button in operational communication with the counter;
   an opening disposed in the front side and extended to proximal the hand cutout;
   a threaded shaft disposed through the top end and into the opening;
   an adjustment knob disposed atop the threaded shaft, the adjustment knob external the top end;
   an axled wishbone disposed on the threaded shaft within the opening;
   an adjustment wheel disposed within the axled wishbone, the adjustment wheel having a rotation in a vertical plane, the rotation being parallel to the front side;
   a lower axle disposed within the bottom end, the lower axle disposed within a horizontal plane and oriented in a direction from the front side to the back side; and
   a pair of spaced apart counter wheels disposed on the lower axle, the counter wheels disposed partially within the opening, the counter wheels rotating in the vertical plane, the counter wheels being in operational communication with the counter;
   wherein the adjustment knob is configured to adjust a distance between the adjustment wheel and the counter wheels, wherein the distance is substantially a diameter of a pipe.

* * * * *